(12) United States Patent
Rea

(10) Patent No.: US 6,220,657 B1
(45) Date of Patent: Apr. 24, 2001

(54) COVER SYSTEM FOR A GOLF CART

(75) Inventor: Gerald M. Rea, Auburn Hills, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/460,826

(22) Filed: Dec. 14, 1999

(51) Int. Cl.[7] .............................. B60J 7/00; B60J 7/047
(52) U.S. Cl. ............................. 296/220.01; 296/216.03; 296/216.04
(58) Field of Search ................................. 296/77.1, 102, 296/220.01, 216.02, 216.04, 216.03

(56) References Cited

U.S. PATENT DOCUMENTS

| | | | |
|---|---|---|---|
| Re. 35,757 | * 3/1998 | Heavner | 296/77.1 |
| 1,826,871 | * 10/1931 | Ford | 296/220.01 |
| 1,831,907 | * 11/1931 | Hart | 296/220.01 |
| 2,122,712 | * 7/1938 | Bishop | 296/220.01 |
| 2,555,942 | 6/1951 | Supplee . | |
| 2,602,693 | * 7/1952 | Murphy | 296/220.01 |
| 3,165,762 | * 1/1965 | Hage | 296/220.01 |
| 3,550,948 | * 12/1970 | Thompson, Jr. | 296/216.04 |
| 3,649,072 | * 3/1972 | Cross | 296/220.01 |
| 4,415,195 | * 11/1983 | Furukawa et al. | 296/220.01 |
| 4,626,024 | * 12/1986 | Swann | 296/216.03 |
| 4,630,858 | * 12/1986 | Bez | 296/216.04 |
| 4,832,395 | 5/1989 | Lovaas . | |
| 4,893,868 | * 1/1990 | Miller et al. | 296/220.01 |
| 5,061,003 | 10/1991 | Gabas . | |
| 5,067,766 | * 11/1991 | Lovaas | 296/220.01 |
| 5,190,340 | * 3/1993 | Nuscher | 296/77.1 |
| 5,197,779 | 3/1993 | Mizuno et al. . | |
| 5,259,656 | 11/1993 | Carroll . | |
| 5,387,010 | * 2/1995 | Mohr | 281/43 |
| 5,429,290 | 7/1995 | Greene, Jr. . | |
| 5,516,182 | 5/1996 | Aragon et al. . | |
| 5,542,735 | * 8/1996 | Furst et al. | 296/107.18 |
| 5,558,388 | * 9/1996 | Furst et al. | 296/107.18 |
| 5,688,018 | * 11/1997 | Simpson | 296/77.1 |
| 5,816,989 | 10/1998 | Marcum . | |
| 5,979,968 | * 11/1999 | Essig et al. | 296/102 |
| 6,012,767 | * 1/2000 | Farmont | 296/220.01 |
| 6,056,352 | * 5/2000 | Ewing et al. | 296/216.03 |

* cited by examiner

Primary Examiner—D. Glenn Dayoan
Assistant Examiner—Hilary Gutmas
(74) Attorney, Agent, or Firm—Brooks & Kushman P.C.

(57) ABSTRACT

Disclosed is a manually actuated sliding golf cart cover system to protect both the occupants and the golf equipment from the elements. Several overlapping panels are configured such that they telescope one with respect to the other in the closed position until all that is visible is a single panel. In the deployed position, the several overlapping panels form a roof cover and the rear-most panel pivots around a hinge and extends over an item storage area thereby protecting the golf equipment housed therein.

9 Claims, 2 Drawing Sheets

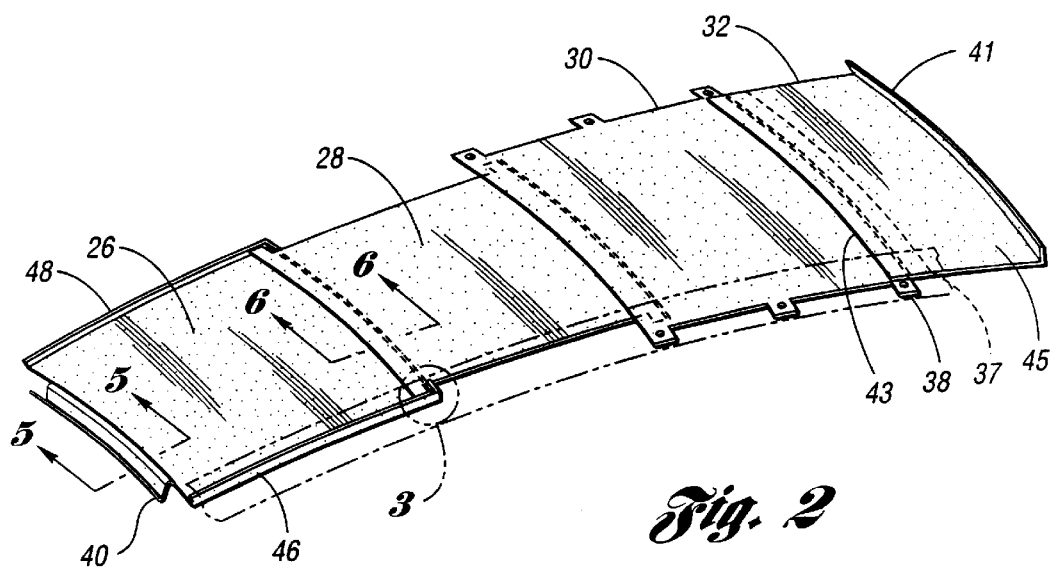
Fig. 2
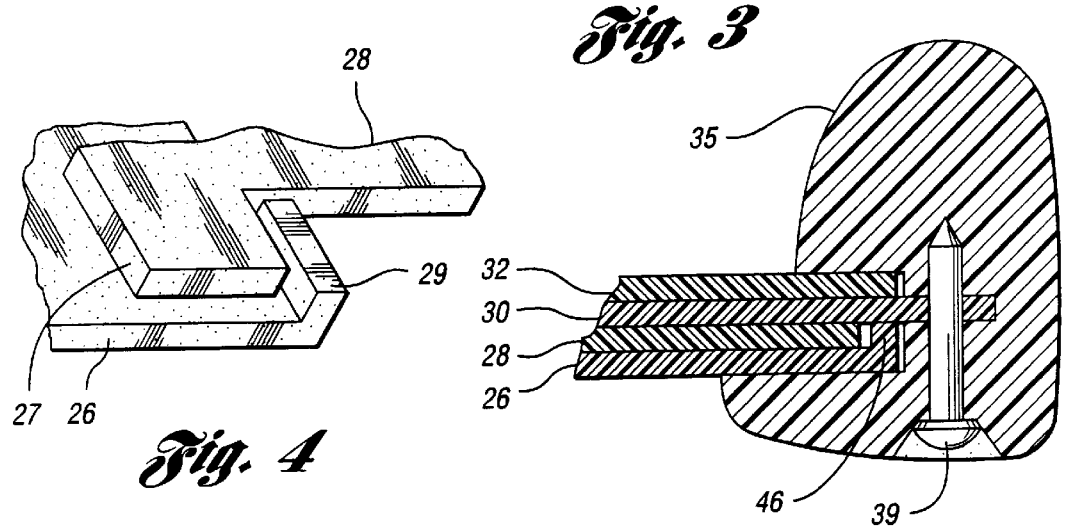
Fig. 3
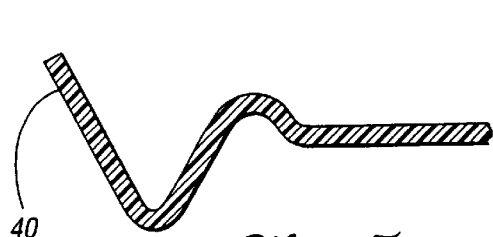
Fig. 4
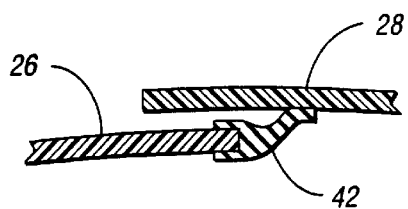
Fig. 5
Fig. 6

COVER SYSTEM FOR A GOLF CART

TECHNICAL FIELD

The invention relates to a manually actuated, telescoping cover system for a golf cart.

BACKGROUND ART

The use of roof covers and canopy tops have been described in prior art. By way of example, U.S. Pat. No. 2,555,942 issued Jun. 5, 1951 to Supplee; U.S. Pat. No. 5,516,182 issued May 14, 1996 to Aragon et al. and U.S. Pat. No. 4,832,395 issued May 23, 1989 to Lovaas, disclose truck bed covers which are intended to protect the cargo from the elements. U.S. Pat. No. 5,516,182, has one fixed panel, under (or over) which a plurality of other panels slide and has motor driven elements. U.S. Pat. No. 5,197,779 issued Mar. 30, 1993 to Mizuno et al. also discloses a telescoping roof with a stationary rear panel over which other panels slide; such sliding is motor driven.

U.S. Pat. No. 5,429,290 issued Jul. 4, 1995 to Greene Jr. and U.S. Pat. No. 5,259,656 issued to Carroll Nov. 9, 1993, disclose golf cart covers intended to protect both the passengers and the cargo from the elements. These covers can be distinguished from the present invention in several ways. For example, the covers themselves are flexible—i.e., made from plastic or canvas thus they may be retracted differently. U.S. Pat. No. 5,259,656 describes a cover that rolls up when not in use, and is hidden from view by a shroud. U.S. Pat. No. 5,429,290 describes a canopy which pivots on hinges to allow access to the cargo carrier.

Neither of the two golf cart covers has the improved telescoping cover system of this invention.

DISCLOSURE OF INVENTION

The present invention discloses a plurality of sliding panels that when extended provide a roof cover and a storage item cover for a golf cart.

The invention accomplishes this by having overlapping sliding roof panels that telescope into each other such that a single panel is visible in the fully collapsed or retracted state. Alternatively, in the fully extended position with all panels deployed, a roof cover and an item storage cover is provided. The roof panels are positioned on the open top of the golf cart structure such that the roof panels are supported by four support beams or columns anchored in the chassis or body of the golf cart. The panels fit within a rectangular framework bounded lengthwise by grooved aluminum or plastic side rails that allow the panels to telescope one into the other with ease. To close the roof over the passenger area, the panels are moved by pulling on the grab-bar attached to the first (foremost) panel. In the fully extended position, the panels are held in place by an extruded rubber seal that runs horizontally across the top of the roof at the junction between one panel and the next. This seal allows for ease of movement and additionally protects the occupants from rain falling between the spaces between panels. To open the roof and allow in natural light, the grab-bar attachment is pushed back to retract the panels. The rearmost panel extends over a storage area for the golf clubs to protect the clubs from rain or the like. The rearmost panel can also be installed on a fixed roof golf cart as a separate addition.

Accordingly, an object of this invention is to protect both the occupants and equipment in an improved golf cart during inclement weather.

Another object of this invention is an improved golf cart to allow the riders access to natural sunlight, when the weather is conducive to being outdoors by virtue of sliding panels that telescope one with respect to the other in the retracted position.

Another object of this invention is to provide an improved solid roof cover with defined rooflines as opposed to a floppy canvas type cover.

An additional object of this invention is to provide an improved roof cover for a golf cart that is aesthetically pleasing and functionally versatile.

A more specific object of this invention is to provide a cover system for a cart having a passenger area, an item storage area and a roof framework defining an opening over at least one of the areas. The cover system has one stationary panel in a stationary relationship with respect to the roof framework and covering a portion of the opening, and a plurality of movable panels in telescoping relationship with the stationary panel, with at least one of the movable panels in telescoping relationship with the stationary panel, at least one of the movable panels being telescopingly movable in the opening with respect to the framework away from the stationary panel in one direction to cover at least a portion of the passenger area, and at least another of the movable panels being telescopingly movable with respect to the roof framework away from the stationary panel in another direction to cover at least a portion of the item storage area.

The cover system covers the golf cart and the item storage area which contains a bag of golf clubs. One of the movable panels, when in the fully extended position, is sufficiently large to protect the bag of golf clubs.

The cover system also has an extruded rubber seal which runs across the junction between panels such that rain or other wind borne items are prevented from entering from the roof area.

The cover system rests within a rectangular framework bounded horizontally or longitudinally by two grooved plastic composite material rails and bounded laterally by two grooved aluminum or plastic side rails.

The cover system as described is further supported by four support columns made of molded plastic composite material attached to the body of the golf cart by support brackets or manufactured as part of the cart.

More particularly, three panels rest within a rectangular framework bounded horizontally by two grooved plastic composite material rails, bounded laterally by two grooved aluminum or plastic side rails and supported by four support columns made of molded plastic composite material attached to the body of the golf cart by support brackets or manufactured as part of the cart.

BRIEF DESCRIPTION OF DRAWINGS

FIG. 2 is a schematic illustration of the panels, showing in part the sliding roof panels of the golf cart cover system telescopingly extended in a position for covering the passenger area and the item storage area in accordance with the preferred embodiment of the present invention;

FIG. 3 is a fragmentary cross-sectional view taken along lines 3—3 in FIG. 1 of the golf cart with the roof panels telescopingly retracted and supported in the golf cart framework;

FIG. 4 is a fragmentary view at the phantom circled portion numbered 3 in FIG. 2 of a typical panel stop for the telescoping roof panels in a fully extended position;

FIG. 5 is a fragmentary cross-sectional view taken along lines 5—5 in FIG. 2 depicting the grab-bar which may be used to manually extend and retract the roof panels of the cover system; and FIG. 6 is a fragmentary cross-sectional view taken along lines 6—6 in FIG. 2 to show an extruded rubber seal between the relatively movable panels of the cover system.

DETAILED DESCRIPTION OF THE PREFERRED EMBODIMENT

Figure 1:
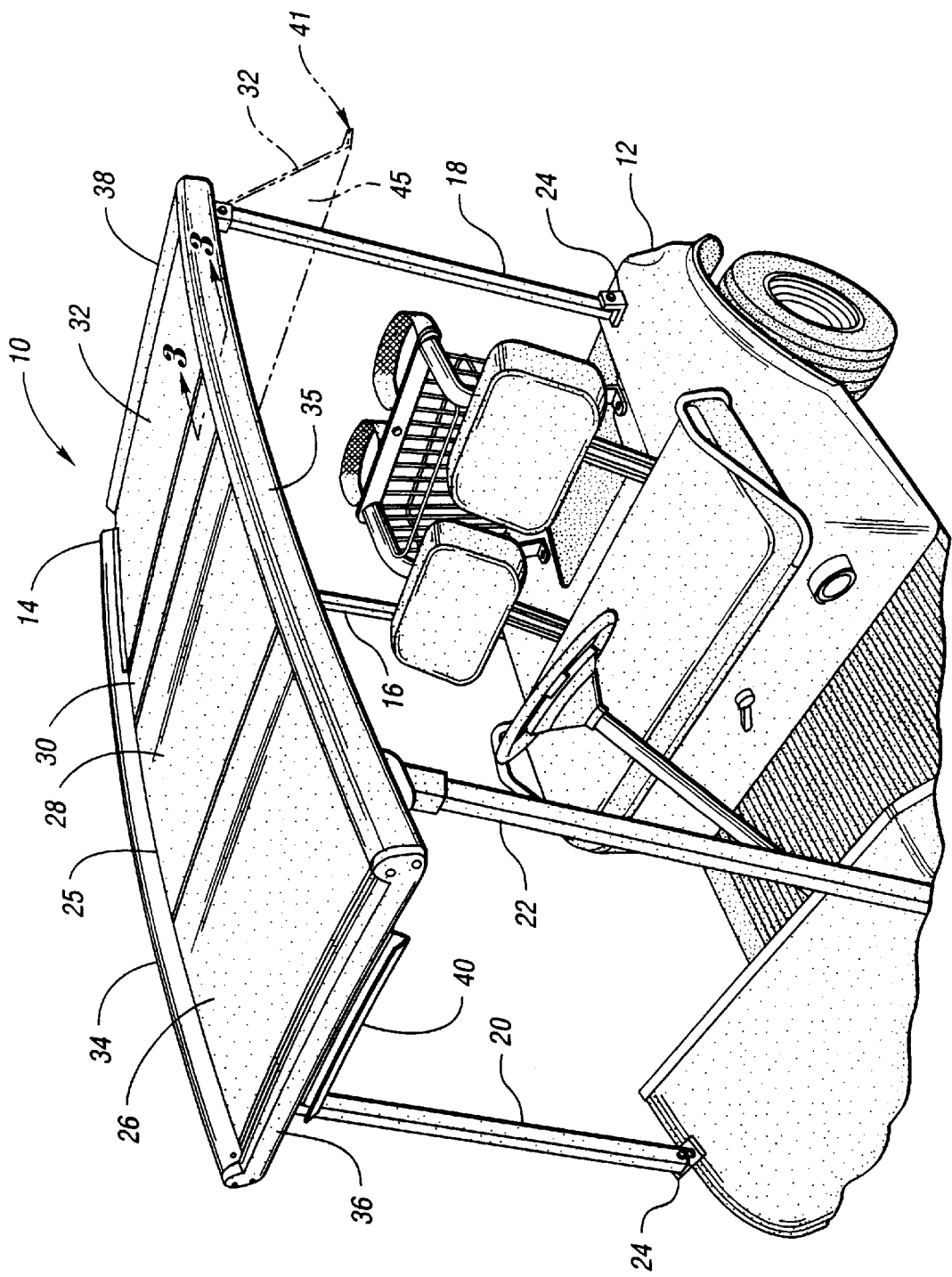
FIG. 1 a fragmentary perspective view of a golf cart having the improved cover system of this invention in a telescopingly extended covering position for the passenger area and the item storage area (as extended in phantom)

Referring to the drawings in detail, in particular to FIG. 1 a golf cart 10 is shown. The cart has a body 12 and a rectangular roof framework 14 supported by four tubular columns 16, 18, 20, 22 embedded in the cart body or attached to attaching brackets 24 on the body 12 of golf cart 10. The rectangular area or opening 25 in which the three slidable or movable panels 26, 28, 32 rest is bounded lengthwise on each side by a grooved aluminum or plastic or plastic composite side rail 34, 35 and laterally on each end by a plastic composite material front header 36 and a plastic composite material rear header 38. Panel 32 is slidable to the rear in the roof framework and may be articulated (as by a living hinge 37) so that a portion of the panel may fold down over the golf club storage area when the panel is in the rearmost position. The framework 14 for the roof is supported by four tubular support columns 16, 18, 20, 22 made of a plastic composite material embedded in the chassis of the golf cart or held by support brackets 24. Grab-bar 40 is attached to or formed integrally with panel 26 allowing for manual extension or retraction of the front panels 26, 28 over the passenger area. Grab bar 41 is similarly formed on back panel 32 for manual extension and retraction of the back panel with respect to the golf club storage area.

FIG. 2 is a top view of the golf cart panels forming the cover system for the cart. For this purpose manually actuated sliding or telescoping panels 26, 28, and 32 are depicted along with fixed panel 30 and without the circumscribing framework 14. The top roof or cover of the golf cart comprises a total of two slidable panels 26 and 28 and a fixed panel 30 which is secured to each side rail 34, 35 by a fastener such as 39 in FIG. 3. The roof or cover panels are manufactured from a composite material but may be in sheet material which can slide in a rail. Panel 32 is designed in the deployed position to cover a rearmost portion of the top roof (cover lapping panel 30) plus the equipment stored at the rear of the golf cart and may be articulated so that a portion 45 could fold down for a more complete coverage of the golf clubs or equipment. Such deployment may also provide additional protection for the golfers from a driving rain from behind. The top roof of the golf cart 10 includes the two aluminum or plastic grooved side rails 34, 35 running the length of the roof in which the sliding panels 26, 28, and 32 slide with respect to fixed panel 30 when fully extended or deployed. When panel 32 is fully extended, it is unsupported by the side rails except for a small trailing cover portion 43 which remains in the rail adjacent the hinge and is stopped or interlocked with panel 30 in a manner similar to that shown in FIG. 4.

FIG. 3 shows panel 26, 28, 30 and 32 in the fully retracted position with the top of the cart open over the passenger area. When several panels have been telescopically folded or slid into the retracted position, the rearmost panel 32 overlays a portion of fixed panel 30 and forward panels 26 and 28 underlay fixed panel 30. Panel 26 has turned up sides 46, 48 to cradle panel 28 and assist in directing and diverting rain from the golfers. The forward panels 26 and 28 may be operated independently of the rearmost panel 32.

FIG. 4 shows how panel 26 interlocks with panel 28 in the extended position. Panel 26 has an L-shaped end 29 at each side of the panel end which interlocks with a inverse L-shaped end 27 in panel 28. A similar interlock is formed between fixed panel 30 and the slidable rearmost panel 32 and between fixed panel 30 and the rearmost end of panel 28, see FIG. 2.

FIG. 1 and FIG. 5 show grab-bar 40 which is used for manually extending or retracting the panels. A similar grab-bar 41 is on the trailing edge of panel 32.

With reference to FIG. 6, about 25 millimeters from the junction between juxtaposed panel 26 and panel 28 or panel 28 and 30 or panel 30 and panel 32 is an extruded rubber seal 42 running between the juxtaposed panels where they overlap. This extruded rubber seal 42 is intended to hold the panels in place, facilitate ease of movement of the panels and protect the occupants and equipment by preventing leaks between the panels.

From the foregoing description, it will be apparent that an effective telescoping panel sliding roof has been described which provides protection both for the passengers as well as equipment carried in a golf cart.

While the preferred embodiment has been described, it will be understood that it is not intended to limit the scope of the invention thereto, as many minor changes in the detail of the construction may be incorporated without altering the purpose of the invention. The use of other materials of construction is not beyond the scope of this disclosure and the materials disclosed in this invention should not be construed as a limitation on the disclosure.

What is claimed is:

1. A cover system on a cart having a passenger area, a roof framework defining an opening over the passenger area, and an item storage area rearwardly of the roof framework, the cover system comprising:

a stationary panel in stationary relationship with respect to the roof framework and covering a portion of the opening;

a plurality of movable panels in telescoping relationship with each other and the stationary panel;

at least one of the movable panels being telescopingly movable in the opening with respect to the framework away from the stationary panel in one direction to cover at least a portion of the passenger area; and at least another of the movable panels being movable with respect to the roof framework away from the stationary panel in another direction to cover at least a portion of the item storage area.

2. The cover system of claim 1 wherein the cart is a golf cart and the item storage area is adapted to contain a bag of golf clubs and wherein at least another of the movable panels is sufficiently large to protect the bag of golf clubs when the panel is moved away from the stationary panel in such other direction.

3. The cover system of claim 1 wherein the movable panels are juxtaposed and an extruded rubber seal runs between the movable panels where the movable panels are juxtaposed such that rain or other wind borne items are prevented from entering the passenger area between the movable panels.

4. The cover system of claim 1 wherein the roof framework is a rectangular framework bounded in one location by grooved plastic composite material rails, one on either side of the framework and bounded in another location by grooved aluminum or plastic or plastic composite rails, one on either side of the framework.

5. The cover system of claim 1 wherein the cart includes a body and the roof framework is supported by four support columns made of molded plastic composite material attached to the body of the cart by support brackets.

6. The cover system of claim 1 wherein the cart includes a body and the roof framework is supported by four support columns made of molded plastic composite material attached to the body of the cart by support brackets integral with the body of the cart.

7. The cover system of claim 4 wherein the cart includes a body and the roof framework is supported by four support columns made of molded plastic composite material attached to the body of the cart by support brackets on the body of the cart.

8. A manually actuated cover system for a golf cart, the cover system comprising:

a roof framework having an opening and adapted to be supported on the golf cart;

an item storage area rearwardly of the roof framework;

a stationary panel in stationary relationship with respect to the roof framework and covering a portion of the opening;

a plurality of movable panels in telescoping relationship with each other and the stationary panel, at least one of the movable panels in telescoping relationship with the stationary panel;

at least one of the movable panels being telescopingly movable in the opening with respect to the framework away from the stationary panel in one direction to cover at least a portion of a passenger area; and at least another of the movable panels being telescopingly movable with respect to the roof framework away from the stationary panel in another direction to cover at least a portion of the item storage area.

9. The cover system of claim 8 wherein the panel movable with respect to the roof framework in another direction to cover at least a portion of the item storage area hingedly mounted with respect to the roof framework to further cover the item storage area.

* * * * *